April 6, 1937.  V. H. DE BOLT  2,076,071
PNEUMATIC MACHINE BASE
Filed Feb. 8, 1936

INVENTOR
V. H. DeBolt.

Patented Apr. 6, 1937

2,076,071

UNITED STATES PATENT OFFICE 2,076,071

PNEUMATIC MACHINE BASE

Victor Hugo De Bolt, Fairbanks, Territory of Alaska

Application February 8, 1936, Serial No. 62,954

1 Claim. (Cl. 248—22)

The invention relates to supplementing the operation of keyboard machines such as typewriters. The objects of the invention are as follows: (1), to reduce the noise developed within the machine proper, (2) to absorb the vibrations usually transmitted to the desk and other nearby resonant objects, (3) to lighten the touch of the operator by utilizing the rebound of the machine actuated by the compressed air of the base, thereby increasing his speed and that of the machine, (4) to absorb the chug of the keys as they reach the bottom of the stroke on a rigid desk, (5) to absorb the slam of the returning carriage after each line of writing, (6) to allow a more delicate adjustment of the machine and to retain the same for a greater length of time, and (7) to reduce the fatigue in the hands of the operator.

Figure 1:
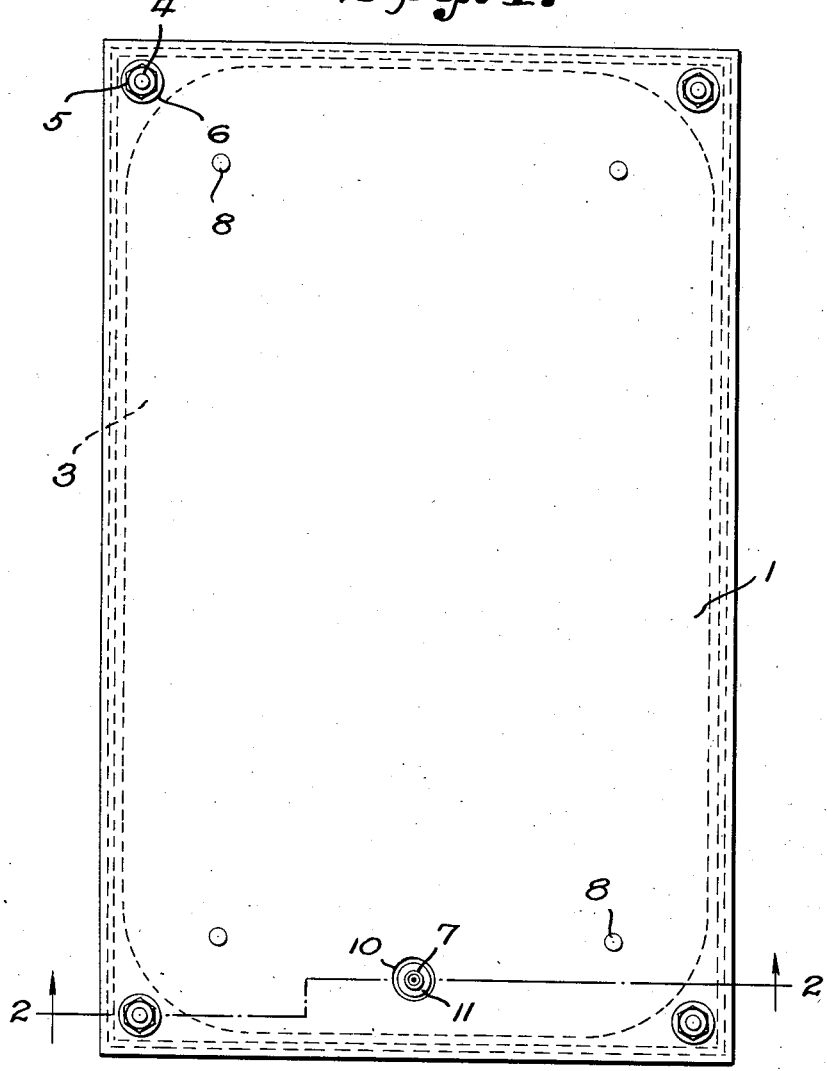
Figure 2:
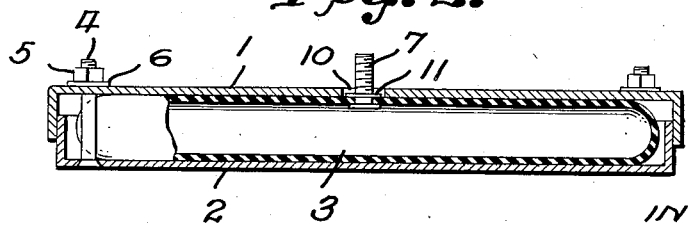

Figure 1 shows a plan view of this device. Figure 2 shows a cross section on line 2—2 of Figure 1, offset to show bladder valve stem.

In the drawing accompanying this specification, 1 represents the upper, and outside, flanged telescopic base element, 2, the lower, and inside, flanged base element, 3, the bladder between the flanged base elements, and 4—4—4—4, the maximum expansion bolts which pass thru both lower and upper flanged elements and limit the expansion of 1 and 2 and allow 1 to be depressed by the stroke of the operator and be thrust back up against the knurled nuts by the force of the compressed air in the penumatic cushion and actuator. 5—5—5—5, the knurled nuts screwed down to the end of the thread against a shoulder on the maximum expansion bolts, 6—6—6—6, the rubber washers between the knurled nuts and 1, 7, the bladder valve stem protruding thru 1, and 8—8—8—8 are the holes for typewriter leg bolts, when 1 is screwed to the machine. The line designated as 2—2 is the lower base offset.

I claim:

A machine base comprising, upper and lower flanged base elements having their flanged edges in telescopic engagement, a pneumatic bag substantially filling the space between said base elements, and adjustable means extending between said base elements to vary the compression of said pneumatic bag, and thereby vary the sound deadening characteristics.

VICTOR HUGO DE BOLT.